United States Patent [19]
Onda

[11] Patent Number: 6,011,659
[45] Date of Patent: Jan. 4, 2000

[54] ZOOM LENS BARREL ASSEMBLY FOR A CAMERA

[75] Inventor: Kazuhiko Onda, Saitama, Japan

[73] Assignee: Fuji Photo Optical Co., Ltd., Saitama, Japan

[21] Appl. No.: 09/162,758

[22] Filed: Sep. 30, 1998

[30] Foreign Application Priority Data

Sep. 30, 1997  [JP]  Japan ................................. 9-266476

[51] Int. Cl.[7] .............................. G02B 15/14; G02B 7/02
[52] U.S. Cl. ...................... 359/704; 359/700; 359/822; 359/823
[58] Field of Search .................................. 359/704, 700, 359/694, 822, 823

[56] References Cited

U.S. PATENT DOCUMENTS 5,617,167  4/1997  Kaji .......................................... 396/448

5,802,404  9/1998  Nishimura .................................. 396/72

FOREIGN PATENT DOCUMENTS 6-100707  12/1994  Japan .
9-43487   2/1997   Japan .

*Primary Examiner*—Georgia Epps
*Assistant Examiner*—Michael A. Lucas
*Attorney, Agent, or Firm*—Young & Thompson

[57] ABSTRACT

A zoom lens assembly for a zoom lens having at least first and second lens groups arranged from a subject side in order comprises a rotatable first barrel, a rotatable second barrel disposed coaxially with the rotatable first barrel and having a cam for shifting the second lens group along the optical axis when it rotates, and an oscillatory gear mechanism for transmitting rotation of the rotatable first barrel to the rotatable second barrel as oscillatory rotation.

16 Claims, 5 Drawing Sheets

ZOOM LENS BARREL ASSEMBLY FOR A CAMERA

BACKGROUND OF THE INVENTION

1. Field of the Invention

This invention relates to a zoom lens barrel assembly for a camera, and, more particularly, to a power driven zoom lens barrel assembly for a camera which is operated by a single power drive element to achieve both adjusting a zoom ratio of the zoom lens and focusing the zoom lens.

2. Description of Related Art

In most zoom lenses, lens groups of the zoom lens are moved along the optical axis by means of a cam mechanism separately for focusing the zoom lens on a subject and adjusting a zoom ratio of the zoom lens. To enable the zoom lens to achieve focusing and zooming by means of a power drive mechanism, there have been proposed several techniques. Specifically, one of the techniques employs separate power drive elements such as electric motors for focusing and zoom ratio adjusting, respectively. Another technique employs a single power drive element. In the case where a single power drive element is used for both focusing and zoom ratio adjusting, there have been known three ways. One of them is to divide driving power of the single power drive element into two power transmission paths for a focusing mechanism and a zoom ratio adjusting mechanism. The other is, as known from Japanese Patent Publication No. 6 - 100707, to incorporate a mechanism common to focusing and zoom ratio adjusting and achieve focusing and zoom ratio adjusting alternately.

The utilization of two power drive elements always yields an increase in camera price. The single power drive element cooperating with separate drive mechanisms for focusing and zoom ratio adjusting always needs an increased number of parts with an adverse effects of not only increasing costs but also increasing an overall size of the camera. The combination of a single power drive element and a common drive mechanism necessitates providing alternate lens guide cam slots for focusing and zoom ratio adjusting which makes a lens drive mechanism quite complex.

SUMMARY OF THE INVENTION

It is accordingly an object of the invention to provide a zoom lens barrel assembly which eliminates almost all drawbacks of the prior art zoom lens barrel assemblies.

It is another object of the invention to provide a zoom lens barrel assembly which is compact in overall size and provided at low costs.

These objects of the invention are accomplished by providing a zoom barrel assembly for a zoom lens comprising at least first and second lens groups arranged from a subject side to an image side in order in which only one of a plurality of barrels is driven to achieve alternately focusing and zoom ratio adjusting of the zoom lens. The zoom barrel assembly comprises a rotatable first barrel rotatable about an optical axis of the zoom lens to shift the first lens group, a rotatable second barrel disposed coaxially with and inside the rotatable first barrel and rotatable about the optical axis relatively to the rotatable first barrel following rotation of the rotatable first barrel to shift the second lens group along the optical axis, and oscillating gear means for transmitting rotation of the rotatable first barrel to the rotatable second barrel as oscillatory rotation.

The oscillating gear means comprises a pinion gear which is rotatable about a center axis of rotation in parallel to the optical axis following rotation of the rotatable first barrel and provided with a linkage pin positioned off from said center axis, and a ring member which is secured to the rotatable second barrel and has a radial guide slot engaged by the linkage pin.

The oscillating gear means further comprises a ring gear which is stationary with respect to the rotatable second barrel and disposed coaxially with and in close proximity to the rotatable first barrel and with which the pinion gear engages. The ring gear is preferably integrally formed with a barrel stationary in rotation with respect to the rotatable second barrel. The pinion gear may be engaged with the ring gear on one side of the pinion gear in a radial direction either close to or remote from the optical axis with respect to the center axis of rotation of the pinion gear.

According to the zoom lens barrel assembly of the invention, the utilization of an oscillating gear mechanism for causing oscillatory rotation between the first and second barrels while the first barrel rotates enables it to achieve alternately focusing and zoom ratio adjustment of the zoom lens by means of only a single power drive device such as an electric motor, which is always desirable for a small sized and low price zoom lens barrel. The oscillating gear means comprised of a pinion gear engaged by the ring gear stationary relative to the rotatable first barrel and a ring member secured to the rotatable second barrel causes planetary action of the pinion gear between the rotatable first and second barrel, so that the oscillating gear means is simple in structure and reliable in alternate focusing and zoom ratio adjusting operation. In particular, in the case where the ring gear is integrally formed with a barrel stationary in rotation relatively to the rotatable first barrel, the oscillatory gear means, and hence the zoom lens barrel assembly, is structured by a reduced number of parts, which is always desirable to provide the zoom lens barrel assembly at low cost.

BRIEF DESCRIPTION OF THE DRAWINGS

The above and other objects and features of the present invention will be understood from the following description of a specific embodiment thereof when considered in conjunction with the accompanying drawings wherein like numbers have been employed in the different figures to denote the structurally and operationally same parts and mechanisms, and in which.

DETAILED DESCRIPTION OF THE SPECIFIC EMBODIMENT

Because zoom lens barrel assemblies are well known, the present description will be directed in particular to elements and mechanisms forming part of, or cooperating directly with, assembly in accordance with the present invention. It is to be understood that elements not specifically shown or described can take various forms well known to those skilled in the art.

Figure 1:
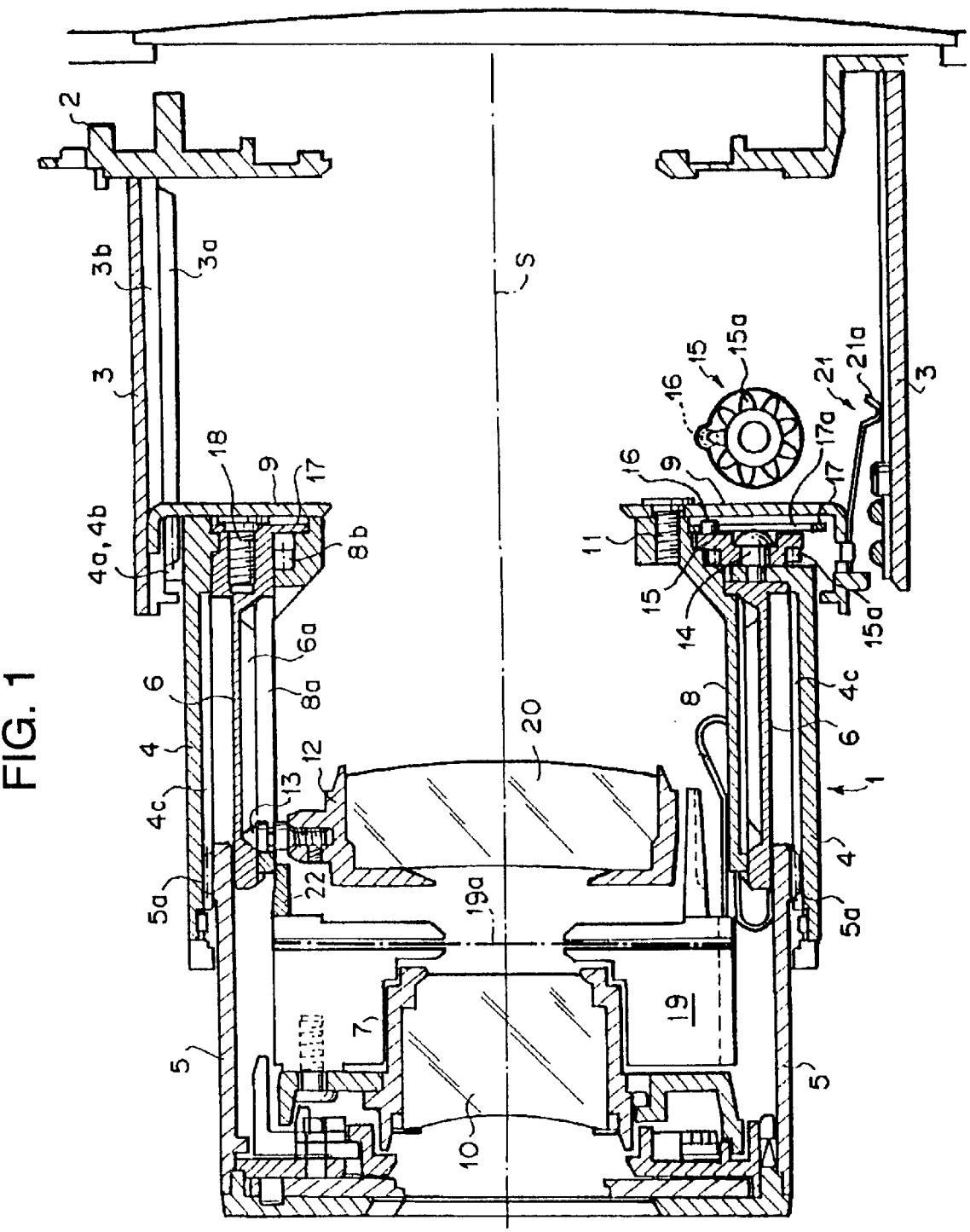
FIG. 1 is a cross-sectional view of a zoom lens barrel assembly in accordance with an embodiment of the invention which is placed in a wide-angle position.
Figure 2:
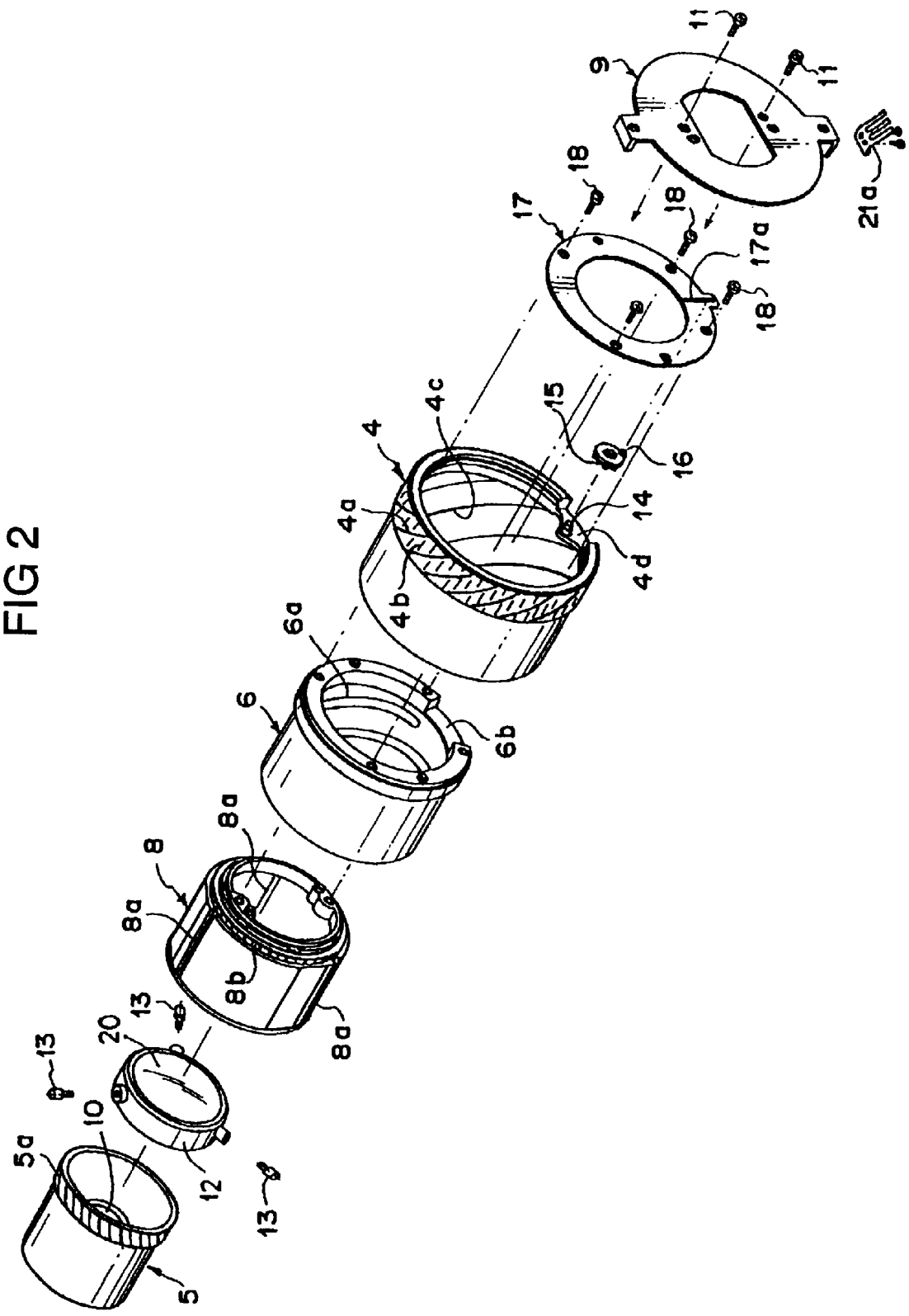
FIG. 2 is an exploded perspective view of the zoom lens barrel assembly shown in FIG. 1.

Referring to the drawings in detail, in particular, to FIGS. 1 and 2 schematically showing a zoom lens barrel assembly 1 in accordance with an embodiment of the invention, the zoom lens barrel assembly 1, which holds a zoom lens consisting of, in this example, front to rear lens groups 10 and 20, comprises cylindrical barrels arranged coaxially with one another with respect to an optical axis S of the zoom lens, namely a stationary barrel 3 fixedly mounted to a camera body 2 schematically shown, a rotatable intermediate barrel or rotatable first barrel 4 disposed to rotate in the stationary barrel 3, a slidable outer barrel 5 disposed in the rotatable first barrel 4 to slide back and force along the optical axis S following rotation of the rotatable first barrel 4 in opposite directions, and a rotatable second barrel 6 disposed to rotate in the slidable outer barrel 5.

The stationary barrel 3 is formed with internal helical threads 3a and axially extending internal guide grooves 3b arranged diametrically opposite to each other on the inside wall thereof. The rotatable first barrel 4 is formed with external helical threads 4a on the outside wall thereof which are engaged by the internal helical threads 3a of the stationary barrel 3, internal helical threads 4c on the inside wall thereof and a peripheral recess 4d at its rear end (the side adjacent to the camera body 2) thereof. Further, the rotatable first barrel 4 is partly formed with external axial threads 4b on the outside wall thereof which are engaged by axial threads of a rod gear (not shown) linked to an electric motor (not shown) externally attached to the stationary barrel 3. When the electric motor is driven in one direction, the rotatable first barrel 4 is rotated through the rod gear to slide back or force along the optical axis S relatively to the stationary barrel 3 through engagement of helical threads 3a and 4a. The rotatable first barrel 4 is provided with a pivot shaft 14 extending backward in parallel to the optical axis S and secured to the rear end within the peripheral recess 4d. The slidable outer barrel 5 is formed with external helical threads 5a on the outside wall thereof which are engaged by the internal helical threads 4c of the rotatable first barrel 4 and fixedly supports at its front end a annular front lens holder 7 which holds the front lens group 10 and to which a shutter unit 19 including a shutter blade 19a is secured. Through engagement between these helical threads 4c and 5a, the slidable outer barrel 5 shifts straight back or forth along the optical axis S as the rotatable first barrel 4 rotates in one direction.

Figure 3:
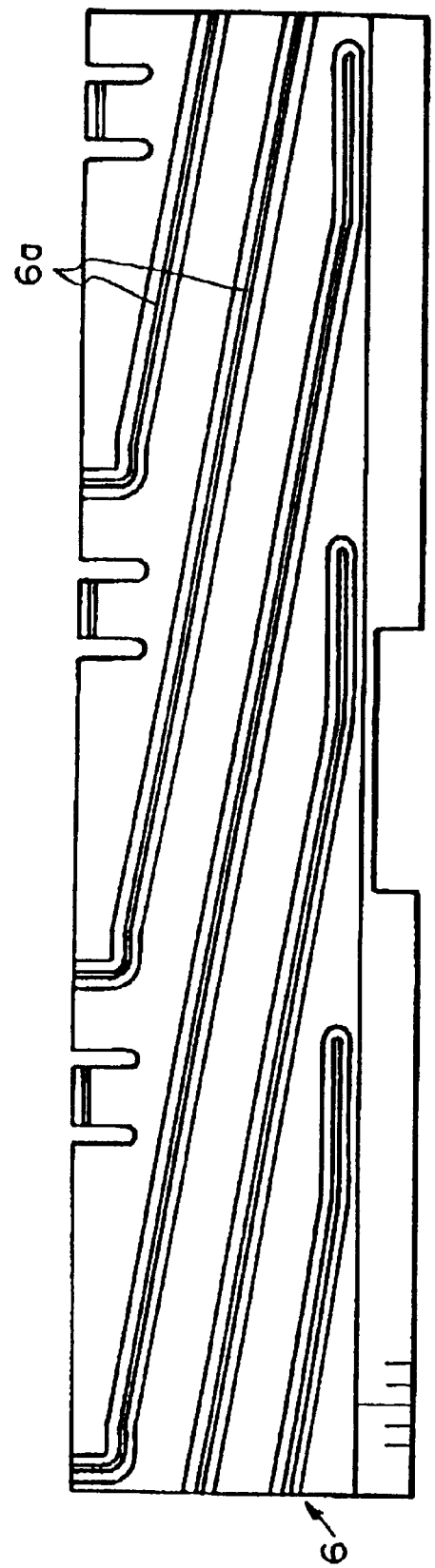
FIG. 3 is an expanded view of a cam barrel formed with cam slots.

A slidable inner barrel 8, disposed coaxially with the rotatable second barrel 6 in the inside of the rotatable second barrel 6, supports the rotatable second barrel 6 for rotation and slides the slidable outer barrel 5 along the optical axis S. The slidable inner barrel 8 is formed with three straight axial slots 8a and an external peripheral gear 8b at its rear end. The peripheral gear 8b need not be formed integrally with the rotatable first barrel 8 but is sufficient to be stationary in rotation with respect to the rotatable second barrel 6. Further, the slidable inner barrel 8 is provided with a retainer ring 9 secured thereto by means of a plurality of set screws 11. The retainer ring 9 has integrally formed straight guide rails 9a extending forward at a right angle therefrom and arranged diametrically opposite to each other. The guide rails 9a are received in the axial guide grooves 3b of the stationary barrel 3 to prevent the inner barrel from rotating but allow the slidable inner barrel 8 to slide back and forth relatively to the stationary barrel 3 along the optical axis S. A stopper 22 is provided between the slidable outer barrel 5 and the slidable inner barrel 8 to cause the slidable outer barrel 5 to slide relatively to the slidable inner barrel 8 along the optical axis S. The rotatable first barrel 4 at its rear end is supported for rotation between the slidable inner barrel 8 and the retainer ring 9. The slidable inner barrel 8 slides along the optical axis S following rotation and axial movement of the rotatable first barrel 4. An annular rear lens holder 12 by which the rear lens group 20 is held is disposed in the slidable inner barrel 8 behind the annular front lens holder 7. The annular rear lens holder 12 is provided with three radially extending cam follower pins 13 arranged at regular angular intervals on the outside wall thereof. The rotatable second barrel 6 is formed with three straight or linear cam grooves 6a, which are spatially spiral with respect to the optical axis S, on the inside wall thereof as shown in detail in FIG. 3 and a peripheral guide recess 6b at its rear end. The peripheral guide recess 6b corresponds in position to the peripheral guide recess 4d of the rotatable first barrel 4 and has a width greater than the peripheral guide recess 4d of the rotatable first barrel 4. The rotatable second barrel 6 is provided with an annular ring 17 secured to the rear end thereon by a plurality of set screws 18. The annular ring 17 is formed with a guide slot 17a extending radially and positioned at the center of the peripheral guide recess 6b.

The cam follower pins 13 extend radially passing through the straight axial slots 8a of the slidable inner barrel 8 and are received in the cam grooves 6a of the rotatable second barrel 6, respectively. Through this engagement between the cam follower pins 13 and the cam grooves 6a, the rear lens holder 12 shifts straight back or forth along the optical axis S according to the cam grooves 6a as the rotatable second barrel 6 rotates in one direction.

A pinion gear 15 formed with gear teeth 15a is pivotally mounted on the pivot shaft 14 to rotate within the peripheral guide recess 4d of the rotatable first barrel 4 and provided with an off axial linkage pin 18 secured thereto and extending off axially backward in parallel to the center axis of rotation of the pinion gear 15. The gear teeth 15a are in engagement with the peripheral gear 8b of the slidable inner barrel 8. While, in this embodiment, the gear teeth 15a are engaged on the one side of the pinion gear 15 in the radial direction close to the optical axis S with respect to the center axis by the peripheral gear 8b of the slidable inner barrel 8, it may be engaged on the opposite radial side remote from the optical axis S with respect to the center axis by the peripheral gear 8b of the slidable inner barrel 8. The off axial linkage pin 16 is received in the guide slot 17a of the annular ring 17. The zoom lens barrel assembly 1 incorporates an encoder 21 disposed between the stationary barrel 3 and the retainer ring 9 to detect predetermined axial positions of the retainer ring 9, and hence the slidable inner barrel 8, caused by rotation of the rotatable first barrel 4 and stops the electric motor when any one of the predetermined axial positions is reached. The encoder 21 has a contact 21a.

When the rotatable first barrel 4 is rotated by the electric motor through the rod gear, it is moved relatively to the stationary barrel 3 along the optical axis S through engagement of the helical threads 3a and 4a. The slidable outer barrel 5 is moved along the optical axis S following rotation of the rotatable first barrel 4 through engagement between the helical threads 4c and 5a. Simultaneously, the slidable inner barrel 8 is moved along the optical axis S because the rear end of the rotatable first barrel 4 is held for rotation between the slidable inner barrel 8 and the retainer ring 9 secured to the slidable inner barrel 8. On the other hand, Rotation of the rotatable first barrel 4 causes planetary action of the pinion gear 15 relative to the peripheral gear 8b of the slidable inner barrel 8. As a result, while the rotatable first barrel 4 rotates in one direction and moves along the optical axis S, the annular ring 17 whose radial guide slot 17a is engaged by the off axial linkage pin 16 of the pinion gear 15, and hence the rotatable second barrel 6 to which the annular ring 17 is secured, turns in the same direction as the rotatable first barrel 4 and moves along the optical axis S in the same direction as the rotatable first barrel 4. The rear lens holder 12 is shifted along the optical axis S through engagement of its cam follower pins 13 with the cam grooves 6a of the rotatable second barrel 6 while the rotatable second barrel 6 rotates and moves along the optical axis S.

Figure 4:
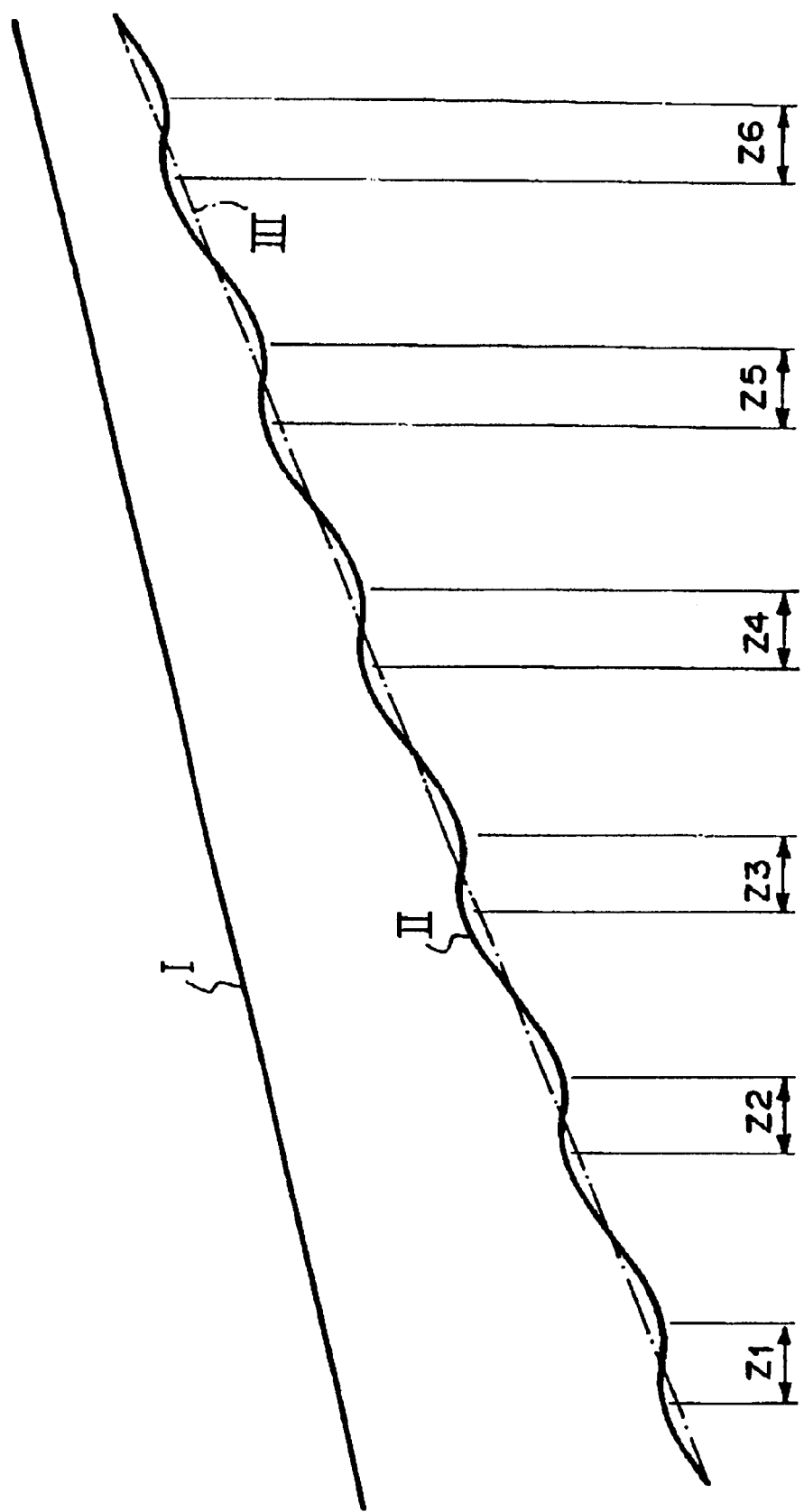
FIG. 4 is a diagram illustrating movement of front and rear lens groups with respect to rotational angular positions of the cam barrel.

FIG. 4 shows a relative position between the front and rear lens holders 7 and 12, and hence the front and rear lens groups 10 and 20. In FIG. 4 line I shows an axial position of the front lens holder 7, i.e. the front lens group 10, and line II shows an axial position of the rear lens holder 12, i.e., the rear lens group 20. Line III shows an axial position of the rear lens holder 12, i.e. the rear lens group 20, which is simulated that the off axial distance of the pin 16 of the pinion gear 15 is zero. Focusing is performed in each of focusing zones Z1–Z6 assigned to the predetermined zoom positions which are detected by the encoder 21, and zoom ratio adjustment is performed between each adjacent focusing zones. As apparent from FIG. 4, focusing is performed in an axial distance zones where a change in axial distance of the rear lens group 20 is small.

Figure 5:
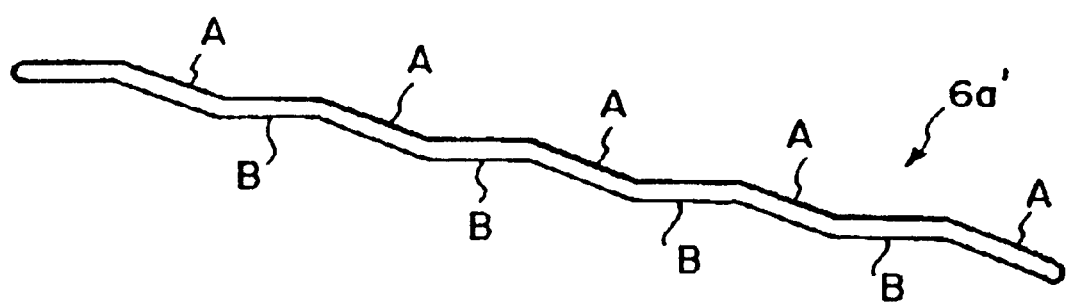
FIG. 5 is an expanded view of a variation of the cam barrel formed with cam slots.

The straight or linear cam groove 6a of the rotatable second barrel 6 may be replaced by a non-linear cam groove 6a' as schematically shown in FIG. 5. Specifically, the non-linear cam groove 6a' comprises alternate cam sections A and B. The cam section A is spatially inclined at an angle relative to the optical axis S, and the cam section B is spatially perpendicular to the optical axis S. The non-linear cam groove 6' is employed with an effect of widening the focusing zone at each zoom position. For example, not only the entire length of cam section B but also part of cam section A is used under the utilization of the annular ring 17 for focusing. Further, the zoom lens assembly 1 may incorporate a pair of the combination of the pinion gear 15 and the annular ring 17 operationally connected by means of an off axis pin 16 arranged in symmetrical positions with respect to the optical axis S, which is always desirable to reduce driving torque necessary to rotate the rotatable first barrel 4 to half. The zoom lens barrel assembly 1 of the invention can be applied to zoom lenses having more than two lens groups with the same result.

It is to be understood that the present invention may be embodied with various changes, modifications and improvements, which may occur to those skilled in the art, without departing from the spirit and scope of the invention defined in the following claims.

What is claimed is:

1. A zoom barrel assembly for a zoom lens comprising at least first and second lens groups arranged from a subject side to an image side in order in which only one of a plurality of barrels is driven to achieve alternately focusing and zoom ratio adjusting of the zoom lens, said zoom barrel assembly comprising:

a rotatable first barrel rotatable about an optical axis of the zoom lens to shift said first lens group along said optical axis;

a rotatable second barrel disposed coaxially with and inside said rotatable first barrel so as to be rotatable about said optical axis relatively to said rotatable first barrel following rotation of said rotatable first barrel to shift said second lens group along said optical axis; and oscillating gear means for transmitting rotation of said rotatable first barrel to said rotatable second barrel such that said rotatable second barrel rotates together with said rotatable first barrel and causes rotational oscillation during rotation of said rotatable second barrel.

2. The zoom barrel assembly as defined in claim 1, wherein said oscillating gear means comprises a pinion gear rotatable about a center axis in parallel to said optical axis following rotation of said rotatable first barrel and provided with a linkage pin positioned off from said center axis, and a ring member secured to said rotatable second barrel and having a radial guide slot engaged by said linkage pin.

3. The zoom barrel assembly as defined in claim 2, wherein said oscillating gear means further comprises a ring gear which is stationary with respect to said rotatable first barrel and disposed coaxially with and in close proximity to said rotatable first barrel and with which said pinion gear engages.

4. The zoom barrel assembly as defined in claim 3, wherein said pinion gear is engaged with said ring gear on one side of said pinion gear in a radial direction close to said optical axis with respect to said center axis.

5. The zoom barrel assembly as defined in claim 3, wherein said pinion gear is engaged with said ring gear on one side of said pinion gear in a radial direction remote from said optical axis with respect to said center axis.

6. A zoom barrel assembly for a zoom lens comprising:

at least first and second lens groups, the first lens group being arranged on the subject side of the second lens group;

a first barrel connected to the first lens group so that rotation of the first barrel causes linear motion of the first lens group along an optical axis of the zoom lens;

a second barrel connected to the second lens group so that rotation of the second barrel causes linear motion of the second lens group along the optical axis of the zoom lens, the second barrel being connected to the first barrel so that rotation of the first barrel causes rotation of the second barrel;

wherein the first barrel is connected to the second barrel so that a relationship between rotational displacement of the first barrel and rotational displacement of the second barrel is oscillatory.

7. The zoom barrel assembly for a zoom lens of claim 6, further comprising:

a pinion shaft extending away from the first barrel;

a pinion gear rotatably mounted to the pinion shaft so that rotation of the first barrel causes rotation of the pinion gear about the pinion shaft, said pinion gear having a guide pin extending away therefrom;

a guide pin follower secured to the second barrel, the guide pin follower having a slot disposed therein, the guide pin follower being arranged so that the guide pin of the pinion gear rides in the slot of the guide pin follower.

8. The zoom barrel assembly for a zoom lens of claim 7, wherein throughout a full range of rotational displacement of the first barrel, rotational displacement of the second barrel is alternately greater than and less than the rotational displacement of the first barrel.

9. The zoom barrel assembly for a zoom lens of claim 8, wherein throughout a full range of rotational displacement of the first barrel, linear displacement of the second lens group is alternately greater than and less than linear displacement of the first lens group.

10. The zoom barrel assembly for a zoom lens of claim 6, wherein throughout a full range of rotational displacement of the first barrel, rotational displacement of the second barrel is alternately greater than and less than the rotational displacement of the first barrel.

11. The zoom barrel assembly for a zoom lens of claim 6, wherein the oscillatory relationship between rotational displacement of the first barrel and rotational displacement of the second barrel is such that there are plural zoom ranges within which rotational displacement of the second barrel is minimized for a given rotational displacement of the first barrel.

12. The zoom barrel assembly for a zoom lens of claim 11, further comprising an electric motor connected to the first barrel so that rotation of the electric motor causes rotation of the first barrel.

13. The zoom barrel assembly for a zoom lens of claim 12, further comprising means for detecting the plural zoom ranges.

14. The zoom barrel assembly for a zoom lens of claim 12, further comprising an encoder which indicates axial displacement of the second lens group, the encoder being connected to the electric motor so that the electric motor only stops when the zoom barrel assembly is positioned within one of the zoom ranges.

15. The zoom barrel assembly for a zoom lens of claim 11, wherein linear displacement of the second lens group is minimized within the zoom ranges.

16. The zoom barrel assembly for a zoom lens of claim 6, wherein throughout a full range of rotational displacement of the first barrel, linear displacement of the second lens group is alternately greater than and less than linear displacement of the first lens group.

* * * * *